United States Patent [19]
Denio

[11] Patent Number: 5,404,519
[45] Date of Patent: Apr. 4, 1995

[54] SYSTEM FOR EXTENDING SOFTWARE CALLS TO FUNCTIONS ON ANOTHER PROCESSOR BY MEANS OF A COMMUNICATIONS BUFFER

[75] Inventor: Michael A. Denio, Sugar Land, Tex.

[73] Assignee: Texas Instruments Incorporated, Dallas, Tex.

[21] Appl. No.: 25,910

[22] Filed: Mar. 3, 1993

Related U.S. Application Data

[63] Continuation of Ser. No. 419,999, Oct. 11, 1989, abandoned.

[51] Int. Cl.⁶ .............................................. G06F 9/40
[52] U.S. Cl. ................................... 395/650; 395/500; 395/700; 364/DIG. 1; 364/281.3; 364/280; 364/281.7; 364/230
[58] Field of Search ................. 364/DIG. 1, DIG. 2; 395/200, 650, 700, 500

[56] References Cited

U.S. PATENT DOCUMENTS

| | | | |
|---|---|---|---|
| 4,530,051 | 7/1985 | Johnson et al. | 395/200 |
| 4,564,901 | 1/1986 | Tomlinson et al. | 395/650 |
| 4,567,562 | 1/1986 | Fassbender | 395/425 |
| 4,646,231 | 2/1987 | Green et al. | 395/650 |
| 4,649,473 | 3/1987 | Hammer et al. | 395/200 |
| 4,768,150 | 8/1988 | Chang et al. | 395/700 |
| 4,825,354 | 4/1989 | Agrawal et al. | 395/600 |
| 4,849,877 | 7/1989 | Bishop et al. | 395/200 |
| 4,851,988 | 7/1989 | Trottier et al. | 395/200 |
| 4,882,674 | 11/1989 | Quint et al. | 395/700 |
| 4,901,231 | 2/1990 | Bishop et al. | 395/325 |
| 4,914,570 | 4/1990 | Peacock | 395/650 |
| 4,920,483 | 4/1990 | Pogue et al. | 395/425 |
| 5,056,003 | 10/1991 | Hammer et al. | 395/650 |
| 5,062,040 | 10/1991 | Bishop et al. | 395/650 |
| 5,073,852 | 12/1991 | Siegel et al. | 395/700 |
| 5,124,909 | 6/1992 | Blakely et al. | 395/200 |
| 5,146,593 | 9/1992 | Brandle et al. | 395/700 |
| 5,218,699 | 6/1993 | Brandle et al. | 395/650 |
| 5,249,293 | 9/1993 | Schreiber et al. | 395/650 |

OTHER PUBLICATIONS

Spector, A., "Performing Remote Operations Efficiently on a Local Computer Network," *Communications of the ACM*, vol. 25, No. 4, pp. 246-260 (Apr. 1982).

Birrell, A. D., et al., "Implementing Remote Procedure Calls", *ACM Transactions on Computer Systems*, vol. 2, No. 1, pp. 39-59 (Feb. 1984).

Jackson, P., "Unix variant opens a path to managing multiprocessor system," *Electronics*, pp. 118-124 (Jul. 28, 1983).

Hughes, R. P., "The Transparent Remote File System," pp. 306-317.

Noren, G., IBM RT PC SNA Access Method Guide and Reference, pp. 9-34 to 9-52 (Aug. 15, 1986).

*Primary Examiner*—Thomas G. Black
*Assistant Examiner*—Wayne Amsbury
*Attorney, Agent, or Firm*—Robert D. Marshall, Jr.; James C. Kesterson; Richard L. Donaldson

[57] ABSTRACT

A method is provided for adding extended functions to a multiprocessor system, specifically, functions that may be called from programming running on a first processor and executed by a second processor. A set of generic entry point commands is provided. Each extended function is associated with an entry point command, that is appropriate for the function's argument format and return requirements, if any. Each entry point command invokes a communications routine that handles the transfer of argument data and return values, if any, between processors.

9 Claims, 5 Drawing Sheets

SYSTEM FOR EXTENDING SOFTWARE CALLS TO FUNCTIONS ON ANOTHER PROCESSOR BY MEANS OF A COMMUNICATIONS BUFFER

This application is a Continuation of application Ser. No. 07/419,999, filed Oct. 11, 1989, now abandoned.

TECHNICAL FIELD OF THE INVENTION

This invention generally relates to computer processing and more particularly to a method, used with a multiprocessor system, of calling a software function from a program running on a first processor, such that the function is executed by a second processor.

BACKGROUND OF THE INVENTION

An important development in computer processing has been systems having more than one processor, each capable of independent action to execute applications programming. Different program tasks may be assigned to different processors, with the result that the execution time of the programming is substantially reduced. One approach to dividing tasks in a multiprocessor system is designating subprograms, which link into a main program running on a first processor, for execution by a second processor.

When designated functions are to be executed by a second processor, a problem with implementing such a division of tasks is that the processors need a means for exchanging data. The physical system requirements of transmitting data in bits, such as communications buffers and data lines, are known—the difficulty lies in the fact that a function's arguments and return values are not determined until run time. The size and type of this data determine how the data may be communicated. Thus, the communications routine must accomplish the run time exchange of values associated with the function.

Because of the difficulty in programming communications programming to solve this problem, some multiprocessor systems have a second processor whose functions are fixed. The user cannot add new functions and is limited to the functions provided with the processor.

In other multiprocessor systems, a programmer may add functions, but must either create a support routine to permit the second processor to execute the function, or use a nonstandard format when defining the function. For this reason, regardless of whether the programmer wrote his or her own function definitions or obtained pre-written function definitions from another, substantial programming effort was required to ensure that the added function would operate in the multiprocessor system.

Thus, a need exists for a multiprocessor system in which functions are extensible. The programmer should not be limited to using only a set number of functions that the second processor is capable of understanding and should be able to add functions to be executed by the second processor with a minimum of programming effort.

SUMMARY OF THE INVENTION

One aspect of the invention is a method of modifying a software program for use with a multiprocessor computer system, such that a function may be called from a program running on a first processor but be executed by a second processor. The method involves selecting a function appropriate for the second processor, selecting a special entry point that is associated with a certain argument format and return requirements, defining the function consistently with that entry point, programming a communications routine consistent with the entrypoint, and adding a function call to the main program.

Another aspect of the invention is a method of programming extended functions for use on a multiprocessor system. The steps of the method are generally the same as those of modifying an existing program, as set out in the preceding paragraph, except that the function is originally coded to conform to properties of a selected entry point.

Another aspect of the invention is a method of using a multiprocessor computer system to divide program tasks between processors. A function to be executed by a second processor is called from a program being executed on a first processor. The function's call is directed to a special entry point that invokes a communications routine. The function's argument data is structured in a format consistent with the entry point. The communications routine invoked at the entry point uses a communications buffer for handshaking between processors, and for passing information to identify and invoke the function. The second processor downloads data for identifying the function and a means for locating its argument data. The entry point may also be associated with a return requirement, which invokes an associated communications routine for transferring a return value, if any, and for modifying data used by the host, if that is required.

Another aspect of the invention is a computer system that permits functions called from a main program running on one processor to be executed by a second processor. Each one of a set of entry points is associated with various function properties. Each entry point is also associated with communications programming that enables the processors to exchange values for function arguments and return values, if any.

A technical advantage of the invention is that a user may program extended functions for a multiprocessor system without substantial programming effort. Special entry points avoid the need to program a special communications routine for each function. Using these entry points, the two processors may use generalized communications routines to exchange values associated with executing the function.

BRIEF DESCRIPTION OF THE DRAWINGS

The novel features characteristic of the invention are set forth in the appended claims. The invention itself, however, as well as modes of use and further advantages, is best understood by reference to the following description of illustrative embodiments when read in conjunction with the accompanying drawings.

DETAILED DESCRIPTION OF THE INVENTION

Environment of the Invention

The description of the invention is primarily directed to implementation of the invention with programs written in the C programming language. However, the programming environment in which the invention will operate is not unique to C. Some common programming language characteristics are described below, both for definitional purposes, and for the purpose of setting out those characteristics that permit the invention to be used with other languages.

The structuring of tasks into program modules, i.e., subprograms, is a useful feature of higher level programming languages. A subprogram permits a main program to execute the process that the subprogram represents without the need to explicitly set out all the steps. This is accomplished by calling the subprogram from within the main program.

A subprogram definition is a collection of statements that describes the actions of the subprogram. A subprogram header is the first line of the subprogram definition, and serves several purposes. First, it may specify that the following syntactic unit is a subprogram definition of some kind. Second, it provides a name for the subprogram. Third, it may optionally supply a list of formal parameters.

Parameters are used to pass values between subprograms. The use of parameters is related to a further feature of subprograms, i.e., their reusability. This is accomplished by the use of parameters in subprogram headings, rather than specific values. The same subprogram may be used more than once in the program, or may be used in a different program, without being entirely redefined. The words "parameter" and "argument" are often used synonymously.

A subprogram call is the explicit request in the main program for the subprogram to be executed. Subprogram calls include the name of the subprogram and a list of the actual parameters to be bound to the formal parameters of the subprogram.

Generally, there are two types of subprograms: procedures and functions. Procedures, known as subroutines in FORTRAN, modify variables and parameters in the calling program. Functions, which are modeled after math functions, do not modify their parameters or outside variables, but rather simply return a value to the calling program.

Apart from the above characteristics, many characteristics of subprograms and their calls are language unique. For example, the headers of subprograms written in FORTRAN or Pascal have special words that identify the subprogram as such, i.e., "subroutine" or "procedure", respectively. On the other hand, the header of a C subprogram has no such special word. Furthermore, in C, all subprograms are functions and the header of a function is recognized by context rather than by a special word. In C, a function is equivalent to a subroutine or function in FORTRAN or a procedure in Pascal. However, in C, it is possible to arrange for a function to modify a variable in a calling routine so that the function operates like a procedure of other languages.

Embodiments of the Invention

For purposes of this description, a subprogram that a user might desire to add to a multiprocessor system, is referred to as an "extended function". More specifically, an extended function is a function that is to be called by a main program running on a first processor of a multiprocessor system, but executed by a second processor. The system running the main program is referred to as the "host processor system" or "host system". The system on which the extended function is to be executed is the "subprocessor system" or "subsystem".

It is assumed that the multiprocessor system has a communications system for handling the passing of data between processors. Hardware features of the multiprocessor system, including the communications system, are discussed below, in connection with FIG. 3.

The "user" of the invention may be various persons who provide parts of a multiprocessor system. For example, the user may be a programmer who desires to add extended functions to a program being prepared for use on the system. Or, the user may be a programmer who supplies extended functions for use by other programmers. The user may be someone actually running a program having extended functions. Furthermore, the invention may be made or sold by any one of these users. The various aspects of the invention discussed below are directed to different users and different physical embodiments of the invention.

The invention is based on a premise that to use extended functions on a multiprocessor system, the host system and the subsystem must have a means for communicating arguments and return values, if any. Yet, arguments and return requirements are two properties that can vary greatly, and thus require different communications programming to handle such transfers. The function's return requirements determine whether the function needs no return value, needs a return value, or modifies variables. The format of the function's arguments, including its argument types, determine how the arguments are passed on the stack.

A basic concept of all aspects of the invention is that a multiprocessor system can accommodate functions having different properties by providing special entry points. An entry point of a subprogram is where the subprogram accepts messages, and is any instruction that may be executed after an instruction not in the subprogram. In the invention, the entry point is used to establish certain properties of data to be exchanged between processor so that both processors know what to expect.

In accordance with this concept, with respect to an extended function's return requirements, the invention accommodates the following cases:

Case 1. No host processor data is modified and no return value is required.

Case 2. No host processor data is modified, but the host requires a return value from the subprocessor.

Case 3. Host processor data is modified by the subprocessor and must be retrieved from subprocessor memory into host memory after the command has executed.

In terms of speed of execution, Case 1 is fastest, Case 2 is slower, and Case 3 is slowest.

With respect to the extended function's argument format, the invention accommodates both immediate reference and reference by one level of indirection, more specifically, the following cases:

Case 1. Argument list with immediate arguments.
Case 2. Argument with pointer(s) to array or structure.
Case 3. Pointer to null terminated string.
Case 4. Argument list with immediate arguments and pointer(s) to array or structure.

As explained below, the argument format affects how the argument data is passed, but generally, rather than passing arguments on the stack, the invention operates by using a pointer on the stack to fetch argument data from a communications buffer.

Because functions may exhibit numerous combinations of return requirements and argument formats, the invention provides entry points that represent combinations of the two sets of cases listed above. The result is a set of entry points that represent various combinations of return requirements and argument formats. This set of entry points is used to ensure that the argument data loaded to a communications buffer by the host processor has the properties expected by the subprocessor system. Each entry point is an entry point to programming associated with the communications system that handles the transfer of data to and from the communications buffer. In the preferred embodiment, each entry point is further associated with an entry point command, which is used to invoke the communications programming.

Figure 1:
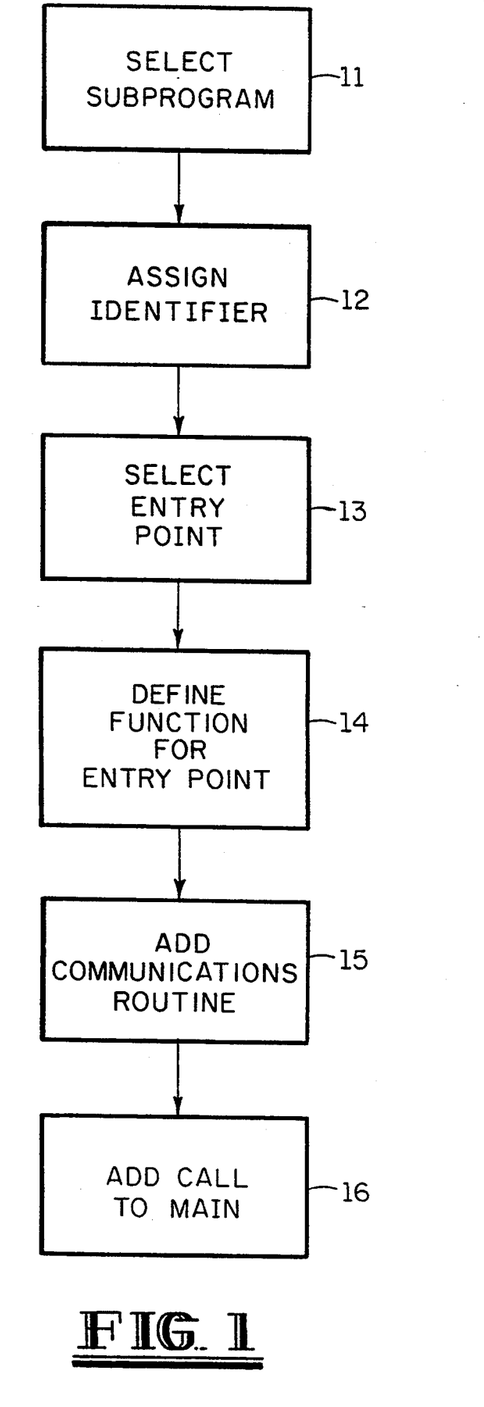
FIG. 1 is a flow diagram of the steps of creating an extended software function for a multiprocessor system.

FIG. 1 shows one aspect of the invention, a method of modifying a software program for use with a multiprocessor system. It is assumed that the user is defining, or has defined, a subprogram that is desired to be executed on a subsystem of a multiprocessor system.

In step 11, the user selects an existing subprogram or prepares a new subprogram, which is desired to be executed by a subprocessor. If not already in subprogram form, in a distinct module, the code is manipulated so that a distinct code module representing the function can be extracted.

In step 12, the user assigns an identifier to the function. In the preferred embodiment, the function identifier has two parts: a module number and a function number. The identifier permits the user to add more than one extended function, by identifying the function to both processor systems. The module number permits the user to group selected functions into modules. If more than one module is loaded to the subsystem, the module number provides a means for the subsystem to select the proper module. For example, the module number provides a means for the subprocessor system to index into an array of module pointers. Thus, the function number provides a means for selecting the proper extended function to be executed at run time.

In step 13, the user selects an entry point from a number of entry points recognized by the communications system. As discussed above, these entry points are each associated with certain communications programming that handles the transfer of data between processors. In the preferred embodiment, each entry point is associated with a command, which is common to both the entry point code in the subprogram and its call in the main program. The entry point is, in effect, a function whose arguments are the extended function's identifier and information about its arguments.

The following examples are representative implementations of entry points and their commands, in accordance with the invention, shown in C language syntax.

In each of the entry points, the "cmd_number" is the function identifier discussed above in connection with step 12. The "length" is the number of binary words or bytes that are to be sent in connection with transferring the function's argument data. Immediate value arguments are identified as arg_1, arg_2, . . . , arg_n.

1. Standard Command

This entry point is used when the function has no return value. The argument list has single length and is comprised of immediate value arguments. The length is in words. An implementation is:

```
void cmd (cmd_number, length, arg_1, arg_2,
    . . . arg_n);
    short       cmd_number;
    short       length;
    short       arg_1, arg_2, . . . arg_n;
```

2. Standard Command with Return

This entry point is similar to the Standard Command, except that after calling the subprogram, the first processor waits for the command to finish, and then fetches and returns the return value. The value is returned to the DX:AX registers. An implementation is:

```
unsigned long ret (cmc_number, length,
    arg_1, arg_2, . . . arg_n);
    short       cmd_number;
    short       length;
    short       arg_1, arg_2, . . . arg_n;
```

3. Standard Memory Send Command

This entry point is used with functions that require information in the form of an array or structure. The length is in bytes rather than words. The ptr argument is a far pointer into host memory. The contents of the pointer are downloaded into the communications buffer. An implementation is:

```
void psnd (cmd_number, length, ptr)
    short       cmd_number;
    short       length;
    char far    *ptr;
```

4. Standard Memory Return Command

This entry point is used with functions that return information in the form of an array or structure. The length, in bytes, is sent as the first element in the command buffer and invokes the function. The function writes the return data into the communications buffer at the word following the length. An implementation is:

```
unsigned long pget (cmd_number, length, ptr);
    short       cmd_number;
    short       length;
    char far    *ptr;
```

5. Standard String

This entry point is similar to the Standard Memory Send Command, but instead of sending a pointer with a known length, it sends a null terminated string. In this case, the communications buffer has no length entry as the first word. Successive bytes of the buffer contain the characters in ptr with a null (zero) terminator. An implementation is:

```
            void pstr (cmd_number, ptr);
    short            cmd_number;
    char far         *ptr;
```

6. Altered Memory Return Command

This entry point is used with functions that send and return information in the form of an array or structure. The entry point combines the functionality of the psnd and pget entry points to send the contents of a pointer of length in bytes, which is then modified by the function. When the function ends, the data is returned to the memory of the first processor pointed to by ptr. An implementation is:

```
    unsigned long palt (cmd_number, length, ptr);
    short            cmd_number;
    short            length;
    char far         *ptr;
```

7. Send/Return Memory Command

This entry point is used with functions that send information in an array or structure and return information to a different array or structure. It is similar to the Altered Memory Return Command, except that data is returned to a different area of host memory. An implementation is:

```
    unsigned long ptrx (cmd_number, send_length,
        send_ptr, return_length, return_ptr);
    short            cmd_number;
    short            send_length;
    char far         *send_ptr;
    short            *return_length;
    char far         *return_ptr;
```

8. Mixed Immediate and Pointer Command

This entry point combines immediate and pointer data. The first parameter after the command number is the number of words to send in the same manner as cmd. Following the number of words, are the words themselves, i.e., the immediate data, on the stack. After the immediate data, is a count of the number of pointers to send. Each pointer is preceded by a count of the number of bytes contained in the array or structure that the pointer is pointing to. An implementation is:

```
    void pcmd (cmd_number, num_words, word1,
        word2, . . ., wordn, num_ptrs, cnt1, ptr1,
        ptr2, . . ., cntn, ptrn)
    short            cmd_number;
    short            num_words;
    short            word1;
    short            word2;
      .
      .
      .
    short            num_ptrs;
    short            cnt1;
```

```
    char far         *ptr1;
    short            cnt2;
    char far         *ptr2;
      .
      .
      .
    short            cntn
    char far         *ptrn;
```

Figure 1A:
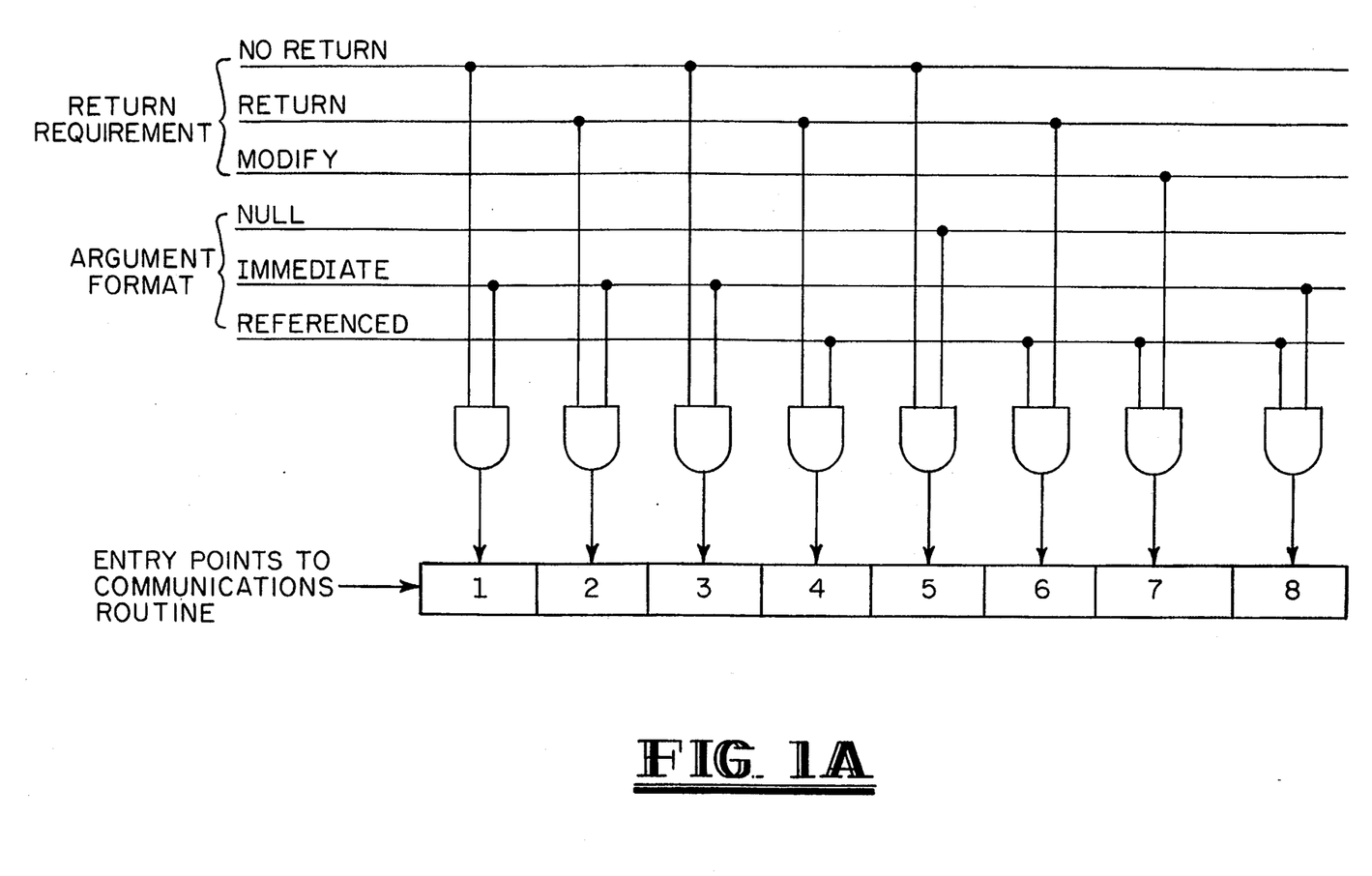
FIG. 1A is a logic diagram illustrating the selection of entry points in accordance with the invention.

FIG. 1A illustrates the logic involved in selecting an entry point as a function of return requirements and argument formats. In FIG. 1A, entry points 1-8 correspond to the entry point examples set out above.

In step 14, the user defines the function to match the selected entry point. In other words, the function's arguments and return requirements are coded in accordance with the selected entry point. Immediate formats are designed to be used when a function needs to pass only a small number of arguments. In this case, the value of each argument is placed in the communications buffer with a pointer to fetch them. Indirect reference formats are designed to be used when the function passes a large number of arguments. In this situation, the arguments are assembled into an array in memory and passed sequentially to the communications buffer, with a pointer to the array to fetch them from the buffer.

Step 15 is programming instructions associated with each entry point to ensure that the communications system correctly transfers the extended function's identifier and its argument data, and any return values. The following examples illustrate code in accordance with part of step 15, for two of the above described entry points, for extracting argument data from a communications buffer. The data_ptr is a pointer to a communications buffer, which is described in connection with FIGS. 4a, 4b, and 4c. The corresponding examples of function calls are described below in connection with Step 16.

| Standard Command | | |
|---|---|---|
| move | A0,*—SP,1 | ; save A0 |
| move | *—A14,A8,1 | ; get data_ptr |
| setf | 16,1,0 | ; get field size 0 to 16 |
|  |  | ; bits |
| move | *A8+,A0,0 | ; get arg_1 into A0 |
| move | *A8,A8,1 | ; get arg_2 into A8 |
| Standard Memory Send Command | | |
| move | *—A14,A11,1 | ; get data_ptr |
| setf | 16,1,0 | ; set field size 0 to 16 |
|  |  | ; bits |
| move | *A11+,A10,0 | ; first word is number |
|  |  | ; of bytes the post |
|  |  | ; increment of A11 |
|  |  | ; means that it is |
|  |  | ; now a pointer to |
|  |  | ; arg_2 [0] |
| srl | 2,A10 | ; convert to arg_1 |

Table 1 explains the move, setf, and srl instructions. The first example, the Standard Command, passes two immediate sixteen bit arguments. The second example, the Standard Memory Send Command, uses indirect memory passing.

TABLE 1

| MOVE Rs, Rd | Move - Register to Register |
|---|---|
|  | Operation: Rs → Rd |
|  | Move the contents of the source register into the destination register. It is not necessary for the registers to be in the same file. |

TABLE 1-continued

| | |
|---|---|
| MOVE Rs, *Rd [.F] | Move Field - Register to Indirect<br>Operation: field in Rs → field in *Rd<br>Move a field from the source register into a memory location specified by the contents of the destination register. |
| MOVE Rs, *Rd+ [.F] | Move Field - Register to Indirect (Postincrement)<br>Operation: field in Rs → field in *Rd<br>Rd + field size → Rd<br>Move a field from the source register into a memory location specified by the contents of the destination register. After the move, increment the contents of Rd by the field size. |
| MOVE Rs, −*Rd [.F] | Move field - Register to Indirect (Predecrement)<br>Operation: Rd - field size → Rd<br>field in Rs → field in *Rd<br>Decrement the contents of Rd by the field size. Move a field from the source register into a memory location specified by the contents of the destination register. |
| MOVE Rs, *Rd(offset) [.F] | Move Field - Register to Indirect with Offset<br>Operation: field in Rs → field in * (Rd + offset)<br>Move a field from the source register into a memory location. The destination address is formed by adding an offset to the contents of the destination register. |
| MOVE Rs, @DAddress [.F] | Move Field - Register to Absolute<br>Operation: field in Rs → field in memory<br>Move a field from the source register into the specified destination address. |
| MOVE *Rs, Rd [.F] | Move Field - Indirect to Register<br>Operation: field in *Rs → field in Rd<br>Move a field from contents of a memory address into the destination register. The source address is specified by the contents of the source register. |
| MOVE *Rs, *Rd [.F] | Move Field - Indirect to Indirect<br>Operation: field in *Rs → field in *Rd<br>Move a field from the contents of a memory address into another memory address. The source address is specified by the contents of the source register, and the destination address is specified by the contents of the destination register. |
| MOVE *Rs+, Rd [.F] | Move Field - Indirect (Postincrement) to Register<br>Operation: field in *Rs → field in Rd<br>Rs + field size → Rs<br>Move a field from the contents of a memory address into the destination register. The source address is specified by the contents of the source register. After the move, increment the contents of the source register by the field size. |
| MOVE *Rs+,*Rd+ [.F] | Move Field - Indirect (Postincrement) to Indirect (Postdecrement)<br>Operation: field in *Rs → field in *Rd<br>Rs + field size → Rs<br>Rd + field size → Rd<br>Move a field from the contents of a memory address into another memory address. The source address is specified by the contents of the source register, and the destination address is specified by the contents of the destination register. After the move, increment the contents of both the source register and the destination register by the field size. |
| MOVE −*Rs, Rd [.F] | Move Field - Indirect (Predecrement) to Register<br>Operation: Rs - field size → Rs<br>field in *Rs → field in Rd<br>Decrement the contents of the source register by the field size. Move a field from the contents of a memory address into the destination register. The source address is specified by the contents of the source register. |
| MOVE −*Rs, Rd [.F] | Move Field - Indirect (Predecrement) to Indirect (Predecrement)<br>Operation: Rs - field size → Rs<br>Rd - field size → Rd<br>field in *Rs → field in *Rd<br>Decrement the contents of both the source register and the destination register by the field size. Move a field from the contents of a memory address into another memory address. The source address is specified by the contents of the source register and the destination address is specified by the contents of the destination register. |
| MOVE *Rs(offset), Rd [.F] | Move Field - Indirect with Offset to Register<br>Operation: field in *(Rs − offset) → field in Rd<br>Move a field from the contents of a memory address into the destination register. The source address is formed by adding an offset to the contents of the source register. |
| MOVE *Rs(offset), *Rd+ [.F] | Move Field - Indirect with Offset to Indirect (Postincrement)<br>Operation: field in *)Rs + offset) → field in (Rd<br>Move a field from the contents of a memory address into the destination register. The source address is formed by adding an |

TABLE 1-continued

| | |
|---|---|
| | offset to the contents of the source register. After the move, increment the contents of the destination register by the field size. |
| MOVE *Rs(offset), *Rd(offset) [.F] | Move Field - Indirect with Offset to Indirect with Offset<br>Operation: field in *(Rs + offset) → field in *(Rd + offset)<br>Move a field from the contents of a memory address into another memory address. The source address is formed by adding an offset to the contents of the source register, and the destination address is formed by adding an offset to the contents of the destination register. |
| MOVE @SAddress, Rd [.F] | Move Field - Absolute to Register<br>Operation: field in source address → field in Rd<br>Move a field from the contents of the specified memory address into the destination register. |
| MOVE @SAddress, *Rd+ [.F] | Move Field - Absolute to Indirect (Postincrement)<br>Operation: field in source address → field in *Rd<br>                Rd + field size → Rd<br>Move a field from the contents of the specified source address into the memory address specified by the contents of the destination register. After the move, increment the contents of the destination register by the field size. |
| MOVE @SAddress, @DAddress [.F] | Move Field - Absolute to Absolute<br>Operation: field in source address → field in destination address<br>Move a field from the contents of the specified source address into the specified destination address |
| SETF FS, FE [.F] | Set Field Parameters<br>Operation: (FS, FE) → ST<br>Load the values specified for the field size and field extension bits into the status register. The remainder of the status register is not affected. |
| SRL K, Rd | Shift Right Logical - Constant<br>Operation: right-shift Rd by K → Rd<br>Right-shift the contents of the destination register by the value of K. (K specified=s a value between 0-31.) 0s are shifted into the MSBs of Rd. and the last bit shifted out is shifted into the carry bit. |
| SRL Rs, Rd | Shift Right Logical - Register<br>Operation: right-shift Rd by Rs → Rd<br>Right-shift the contents of the destination register by the 2s complement value of the 5 LSBs in the source register. (The 5 LSBs of the source register specify a value between 0-31: the 27 MSBs are ignored.) 0s are shifted into the MSBs of Rd. and the last bit shifted out is shifted into the carry bit. |

Key:
Rs—Source register
Rd—Destination register
RsX, Rdx—X half (16 LSBS) of Rs or Rd
RsY, RdY—Y half (16 MSBs) of Rs or Rd
SAddress—32-bit source address
DAddress—32-bit destination address
IW—16-bit (short) immediate value
IL—32-bit (long) immediate value
Address—32-bit address (label)
F—Field select: defaults to 0
K—5-bit constant
PC'—Next instruction
F=0 selects FS0 and FE0
F=1 selects FS1 and FE1

Step 16 is adding a function call to the main program of the host processor. A means for invoking the appropriate entry point when the function is called is required, which in the preferred embodiment is accomplished with a preprocessor that directs the programming to the entry point when the extended function is called. The following examples illustrate the function calls for several of the above described entry point commands.

Standard Command
    The function has two actual parameters, arg_1 of 16 bits and arg_2 of 32 bits. The word count, 3, is the sum of one word for the short argument and two words for the long argument.
        #define function_name (arg_1, arg_2) cmd (FUNCTION_NAME, 3, (short) (arg_1) , (long) (arg_2))
Standard Memory Send Command The function's arg_1 has 4 bytes of data.
        #define function_name (arg_1, arg_2) psnd (FUNCTION_NAME, (short) (4*(arg_1)), (short far*) (arg_2).
Standard Memory Return Command
The function's arg_1 has 4 bytes of data.
        #define function name (arg_1, arg_2) pget (FUNCTION_NAME, (short) (4* (arg_1)) (char far*) (arg_2))

As a result of the above steps, a module containing at least one extended function may now be compiled and linked to the main program. It may be loaded to the subprocessor system such that during run time, the main program calls the function, which is then executed by the subprocessor, with this exchange of processors being invisible to the computer user. FIG. 1 also illustrates another aspect of the invention, which is a method of supplying extended functions for use with a multiprocessor system. In other words, a set of functions may be prepared by one programmer in accordance with steps 11–14, with the step of integrating the functions into the program left to another programmer. An example of this situation might be when extended functions are supplied as a library to an applications programmers, who may then use whatever extended functions are desired for a particular application program.

Figure 2:
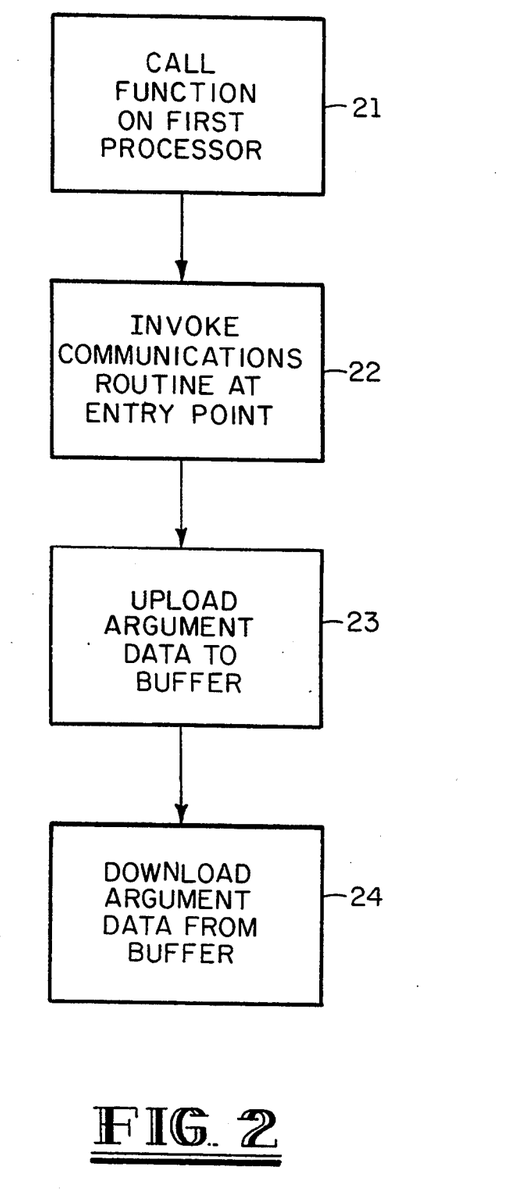
FIG. 2 is a flow diagram of the steps of using a multiprocessor system to run a program on a first processor, which calls a function executed by a second processor.

FIG. 2 illustrates another aspect of the invention, a method of using a multiprocessor computer system to execute a single program having extended functions. As distinguished from the method of FIG. 1, the method of FIG. 2 is a run time process, which is implemented with computer programming. The method is used while running, on a first processor, a main program having at least one subprogram to be executed by a second processor. This subprogram is compiled and loaded to the second processor, which may occur any time before execution.

Basically, the steps of the method of FIG. 2 include first calling the extended function from the main program. This call directs the programming to an entry point of communications programming, which handles the communication of data, used by and returned from the function, between the host processor and the subprocessor.

The method of FIG. 2 is for use on a multiprocessor system having a communication means. FIG. 2 is best understood with reference to FIG. 3, which is a block diagram of a computer system having both a host processor system 310 and a subprocessor system 320. Processors 311 and 321 each have their own memory, 312 and 322. A communication means between the two processors is embodied by bus 330 and communications buffer 323. Bus 330 is bidirectional and provides a sixteen bit data path and nine control lines. Communications buffer 323 can be accessed by both processor systems 310 and 320. In the preferred embodiment, communications buffer 323 is a storage structure, having separate locations for host messages and subprocessor messages and other data. Other hardware implementations of a communications storage means are possible, with the primary requirement being that each processor 311 and 321 has access to memory space, including parameter space for handshaking between processors, function identification space to identify the function being called, and data space to pass command arguments and additional data.

Figure 3:
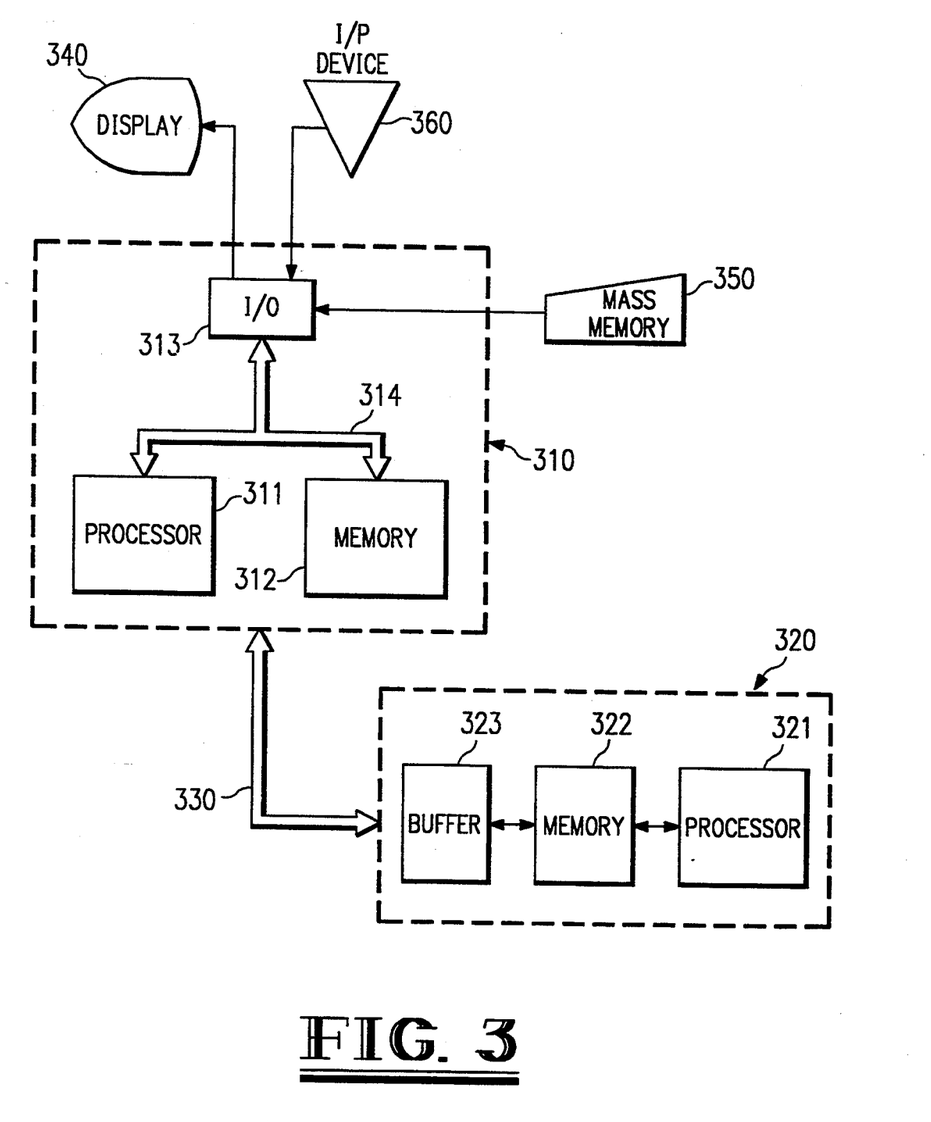
FIG. 3 is a block diagram of a multiprocessor system typical of a system with which the invention is used.

The configuration shown in FIG. 3 is only one of numerous means for providing interprocessor communications, and other means are easily developed. Furthermore, although FIG. 3 shows the two processor systems, 310 and 320, as having separate memories 312 and 322, the communications means may be a shared memory.

The multiprocessor system of FIG. 3 operates with various standard peripheral devices, notably a display 340, mass storage 350, and input devices 360, such as a keyboard or mouse. An I/O circuit 313 is used to communicate information in appropriate form between these input and output devices and the other parts of host system 310, via a host system bus 314. Display 340 and input devices 360 permit a user to interact with the host processor system 310. If subprocessor system 320 is used for graphics tasks, display 340 may be coupled to processor 321 rather than to host system 310.

Referring again to FIG. 2, step 21 is calling an extended function. Ae indicated above, the initial call is from a main program running on host processor system 310, but the extended function definition resides in memory 322 of subprocessor system 320. The call must be directed to subprocessor system 320. Thus, in step 21, the call in the main program directs the host processor to an entry point of communications programming, the latter being programmed Eo transfer data consistent with the properties of the function. In the C language embodiment, the call may be in the form of the preprocessor function calls described above in connection with step 16 with FIG. 1. This syntax is especially useful in the preferred embodiment, for redefining the function call as a call to the entry point, using an entry point command.

Step 22 is initiating communications between the two processor systems 310 and 320. This step involves using the communications programming and communications buffer 323 to perform handshaking routines. These handshaking routines are known in the art, and include the passing of messages to indicate busy, idle, or message waiting conditions. Although, as indicated above, the memory space used to exchange data between processors is described herein as a communications buffer 323, any mutually accessible form of memory space could be used.

Step 23 is loading the extended function's identifier and its argument data into communications buffer 323, using communications programming invoked at the entry point and executed by the host. If the implementation of step 13 above is used, the argument data of an entry point command consists of the identifier and a means for accessing the argument data of the extended function. Step 23 may be referred to as "uploading" extended function data into the mutually accessible memory space, i.e., communications buffer 323.

Figure 4A:
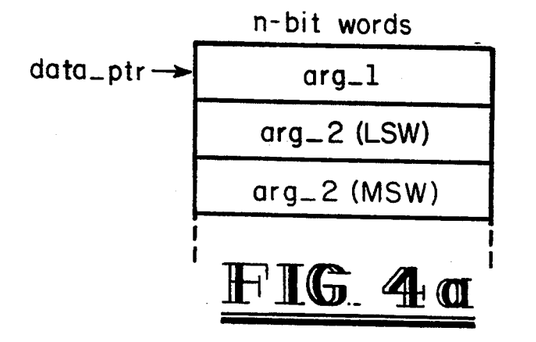
FIGS. 4a, 4b, and 4c illustrate a communication buffer used to transfer argument data of the function to be executed by a subprocessor of the system of FIG. 3.
Figure 4B:
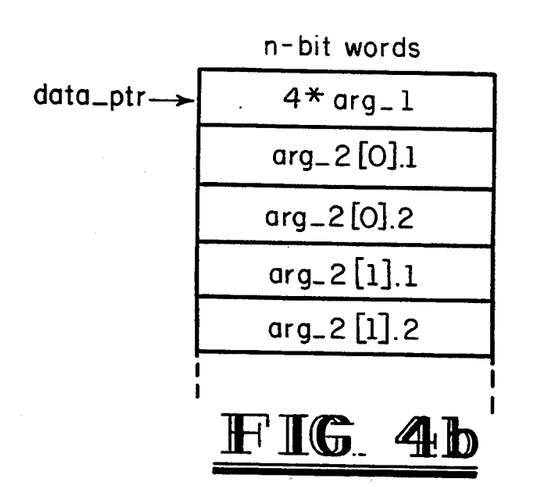
Figure 4C:
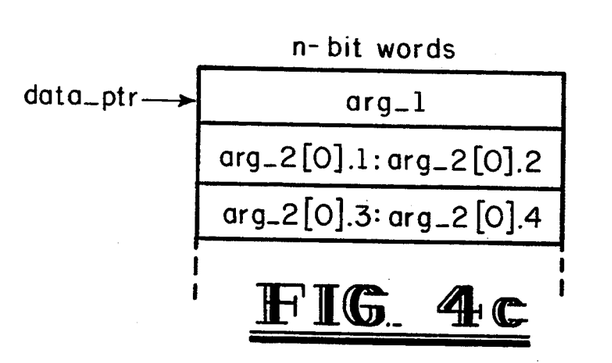

Again, a unique aspect of the invention is that the communications code for passing the extended function's data is in response to an entry point associated with the extended function's properties. FIGS. 4a, 4b, and 4c illustrate data in communications buffer 323 for the entry points Standard, Standard Memory Send, and Standard Memory Return, respectively. The data is consistent with the examples of step 16 of FIG. 1, described above.

Step 24 is loading the extended function data from the communications buffer 323 into subprocessor system 320. Step 24 is illustrated in detail in FIG. 5. The function's identifier is moved to subprocessor memory 322 and decoded so that the proper extended function is called. With respect to the function's argument data, the subprocessor system 320 receives a single argument on the stack that is a pointer to the communications buffer 323 where the argument data of the extended function is stored. This embodiment is in accordance with the examples above, which were described in connection with step 15 of FIG. 1. Step 24 may be referred to as "downloading" the extended function data from the memory space, i.e., communications buffer 323.

Subprocessor 321 may then execute the function. The pointer generated in step 24 is used to retrieve the function's argument data from communications buffer 323 into the local variables of the extended function. Although not shown in FIG. 2, additional steps may involve returning values to host processor system 310 and modifying values used by host processor 311. In accordance with the examples set out above in connection with Step 13 of FIG. 1, it can be seen that each entry point is associated with communications programming that instructs subprocessor 321 how to transfer the return values and where to put them if the function's return requirements, and its associated entry point, call for these tasks to be performed.

Figure 5:
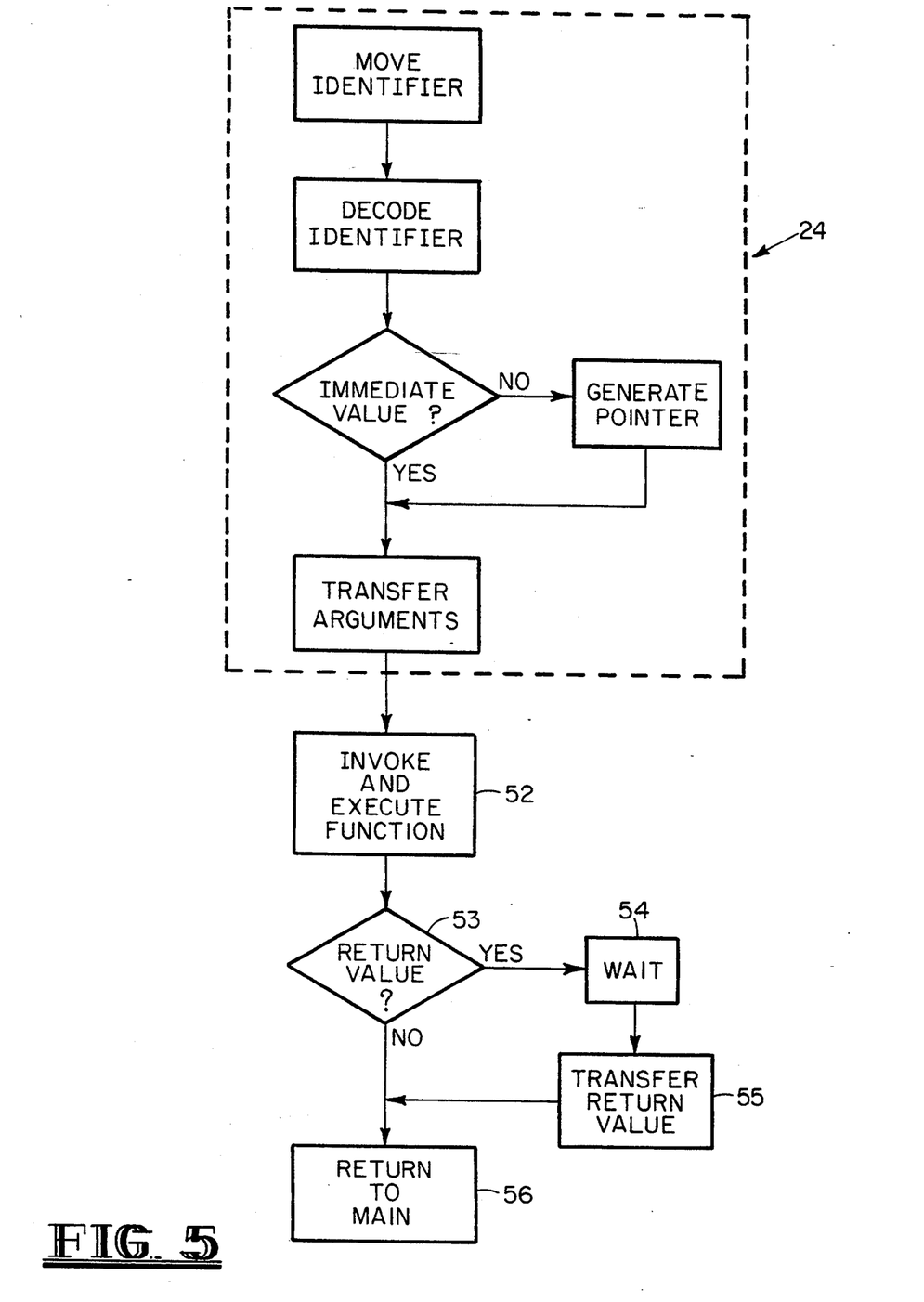
FIG. 5 is a block diagram illustrating a substep of FIG. 2 and post downloading activity on the second processor.

FIG. 5 is a flow diagram illustrating Step 24 of the run time method, including its substeps and subsequent steps that occur on the subprocessor system 320. As explained above, Steps 52-56 comprise executing the function and if an entry point associated with a return value has been used, the method includes waiting for and returning this value.

A feature of the invention is that, to enhance run time speed, subprocessor system 320 does not check the size of the argument data being transferred to communications buffer 323. However, if large amounts of data are expected to be transferred, and buffer 323 is a fixed size, programming is needed to ensure that the data being transferred does not overflow communications buffer 323.

For example, a routine may be created to check the size of the parameters and download them to the subprocessor system 320 if they will fit. If they will not fit, the programming attempts to allocate a temporary buffer from the heap pool to store the parameters. If the allocation is not successful, an error function is invoked.

One implementation of an overflow prevention enhancement is an additional set of entry points, to be used when the argument data has the potential of being too large for communications buffer 323. These entry points have the same function as those above, but invoke additional programming that makes a preliminary pass through the argument data to check its size. If the data will not fit, the programming attempts to allocate a temporary buffer from the heap pool to store the parameters.

Another aspect of the invention is a multiprocessor computer system, which permits functions called from a main program running on a first processor system 310 to be executed by a second processor 321. Each one of a set of entry point commands is associated with various function properties. Each entry point command invokes communications programming that enables processors 311 and 321 to exchange data needed by processor 321 to identify, call, and execute the function. These entry points may be implemented with the programming described above in connection with FIGS. 1 and 2.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description. It is, therefore, contemplated that the appended claims will cover such modifications that fall within the true scope of the invention.

What is claimed is:

1. A method of using a multiprocessor computer system having a first processor and a second processor in data communication with each other via a communications buffer, to call and execute an extended function, wherein said extended function is called by programing of said first processor, but executed by said second processor with function arguments transferred from said first processor to said second processor, comprising the steps of:

storing a communications program in memory of said first processor, wherein said communications program has a predetermined number of a plurality of different routines for transferring different types of function arguments to said communications buffer, and wherein each routine has an entry point for receiving entry point arguments;

providing an application program having a plurality of extended function calls;

redefining said extended function call as an entry point call, wherein said entry point call comprises an entry point command, said entry point command representing an entry point of said communications program of a corresponding one of said routines, and an entry point argument, said entry point argument having values representing a function identifier of said extended function and said types of function arguments corresponding to said corresponding one of said routines;

using said first processor to execute said application program having said redefined extended function call;

using said first processor to execute a selected one of said routines of said communications program at said entry point corresponding to said entry point command in accordance with said entry point argument, such that said function identifier and data represented by said extended function arguments are uploaded to said communications buffer;

using said second processor to download said extended function identifier from said communications buffer;

using said second processor to select an extended function definition associated with said extended function identifier from memory of said second processor system;

using said second processor to pass arguments to said extended function by passing to said extended function a buffer pointer to said communications buffer; and using said second processor to execute said extended function.

2. The method of claim 1, wherein said extended function has at least one argument in the form of a pointer to data, and wherein said step of using said first processor to execute said selected one of said routines of said communications program such that data represented by said extended function arguments are uploaded, comprises uploading the length of said data as well as said data corresponding to each pointer into said communications buffer.

3. The method of claim 2, wherein said extended function has at least one argument in the form of an immediate argument, and wherein said step of using said first processor to execute said selected one of said routines of said communications program such that data represented by said extended function arguments is uploaded, comprises uploading each immediate argument into said communications buffer.

4. The method of claim 2, wherein said extended function has a return value, and wherein said step of using said second processor to execute said extended function is in response to receipt of the length of said data, and further comprising the step of using said second processor to store said return value in said communications buffer.

5. The method of claim 2, wherein:

said step of storing said communications program having a plurality of routines for transferring different types of function arguments includes storing said communications program having routines for differing predetermined combinations of types of function arguments for transmission to said communications buffer and types of function returns for recall from said communications buffer;

said extended function has a function return;

said step of using said second processor to execute said extended function includes uploading a return value into said communications buffer; and further comprising the step of using said first processor to download said return value from said communications buffer after said step of using said second processor to execute said extended function.

6. The method of claim 5 wherein:

at least one of said routines of said communications program has a function return in the form of at least one immediate return;

said step of uploading a return value into said communications buffer includes uploading a return immediate value corresponding to each immediate return into said communications buffer; and said step of using said first processor to download said return value from said communications buffer includes downloading each return immediate value from said communications buffer.

7. The method of claim 5 wherein:

at least one of said routines of said communications program has a function return in the form of at least one return pointer to data;

said step of uploading a return value into said communications buffer includes uploading the length of said data as well as data corresponding to each return pointer to data into said communications buffer; and said step of using said first processor to download said return value from said communications buffer includes downloading said each length of said data and each return pointer to data from said communications buffer.

8. The method of claim 5 wherein:

at least one of said routines of said communications program has a function return in the form of at least one immediate return and at least one return pointer to data;

said step of uploading a return value into said communications buffer includes uploading a return immediate value corresponding to each immediate return and the length of said data as well as data corresponding to each return pointer to data into said communications buffer; and said step of using said first processor to download said return value from said communications buffer includes downloading each return immediate value and each length of said data and each return pointer to data from said communications buffer.

9. The method of claim 1, wherein said step of using said second processor to execute said extended function comprises using a stack memory area to provide said second processor with a pointer to said communications buffer.

* * * * *